(12) United States Patent
Hart

(10) Patent No.: US 10,808,847 B2
(45) Date of Patent: Oct. 20, 2020

(54) ANGLE STOP VALVE WITH DUAL BARBED, MALE FITTINGS FOR CROSS-LINKED POLYETHYLENE (PEX) ENGAGEMENT

(71) Applicant: Shawn Hart, Pleasant View, UT (US)

(72) Inventor: Shawn Hart, Pleasant View, UT (US)

( * ) Notice: Subject to any disclaimer, the term of this patent is extended or adjusted under 35 U.S.C. 154(b) by 164 days.

(21) Appl. No.: 16/254,425

(22) Filed: Jan. 22, 2019

(65) Prior Publication Data
US 2020/0232567 A1 Jul. 23, 2020

(51) Int. Cl.
*F16K 5/04* (2006.01)

(52) U.S. Cl.
CPC ............ *F16K 5/0414* (2013.01); *F16K 5/045* (2013.01)

(58) Field of Classification Search
CPC ................................ F16K 5/0414; F16K 5/045
See application file for complete search history.

(56) References Cited

U.S. PATENT DOCUMENTS

| 5,983,923 A * | 11/1999 | Hobbs ............... E03B 7/095 137/360 |
| 9,290,917 B2 * | 3/2016 | Condon ............ E03C 1/021 |
| 2009/0057591 A1 * | 3/2009 | Izzy ............... F16K 19/006 251/288 |
| 2015/0308593 A1 * | 10/2015 | Brouwer ......... F16L 19/0206 137/315.11 |
| 2015/0330541 A1 * | 11/2015 | McCoy ............ F16K 27/065 285/288.1 |
| 2019/0211944 A1 * | 7/2019 | Ismert ............. F16K 1/12 |

* cited by examiner

*Primary Examiner* — Ryan A Reis
(74) *Attorney, Agent, or Firm* — Steven Rinehart

(57) ABSTRACT

A stop valve having uniquely dimensioned valve inlet shanks and valve outlet shanks, each shank circumscribed by a plurality of concentric flanges adapted to act as barbs for engaging PEX piping.

6 Claims, 8 Drawing Sheets

ANGLE STOP VALVE WITH DUAL BARBED, MALE FITTINGS FOR CROSS-LINKED POLYETHYLENE (PEX) ENGAGEMENT

CROSS-REFERENCES TO RELATED APPLICATIONS

Field of the Invention

This invention relates to stop valves used in residential and commercial plumbing, and more particularly relates to an angle stop valve affixed in place with crimping tools adapted to minimize installation times and reduce costs.

BACKGROUND

Description of the Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Stop valves are adapted to a shut-off water flow through piping to permit the replacement of downstream fixtures or appliances without shutting down a water main or an entire plumbing system in a building. Angle stop valves have inlet and outlet supplies which orient perpendicularly to one another, while straight-through valve comprise inlet and outlet supplies which are coaxially aligned. Stop valves are typically operated to open and close with a quarter turn (90 degrees) of the handle. Stop valves may comprise control sleeves made from low friction resilient thermoplastic material such as a Santoprene™ material or other thermoplastic elastomeric materials. The handle is typically formed from a durable plastic material such as ABS.

Traditional stop valves and traditional plumbing systems in general have used cooper piping and cooper fittings, which are expensive, which corrode with acidic water, and which require adhesive to affix properly. Cooper piping is inefficient for this reason.

With the developing art, tubing or piping formed from cross-linked polyethylene, commonly abbreviated PEX (or XPE or XLPE) has become more common in the industry, and is used commonly in pipework systems, hydronic radiant heating and cooling systems, domestic water piping, and insulation for high tension (high voltage) electrical cables. It is also used for natural gas and offshore oil applications, chemical transportation, and transportation of sewage and slurries. PEX is an alternative to polyvinyl chloride (PVC), chlorinated polyvinyl chloride (CPVC) or copper tubing for use as residential water pipes.

PEX is preferred to cooper tubing in many embodiments because PEX supply is more flexible than alternatives and is available in longer lengths. PEX can be affixed to valves without adhesive. However, as PEX tubing becomes more common in the art, so too does the desirability PEX fittings optimized for efficient installation in connection with PEX tubing, including stop valves which are readily replaced and installed providing sufficient vertical and lateral spacing for use of handheld crimping implements.

In view of the foregoing, it is clear that a more optimal angle-stop valve with dual barbed male fittings for crimping to PEX piping would be desirable.

SUMMARY

From the foregoing discussion, it should be apparent that a need exists for a resistance system that provides enhanced resistance training and enables realistic simulation of movements during a resistance exercise. Beneficially, such an apparatus would provide a plurality of features and components efficacious for resistance training. The present invention has been developed in response to the present state of the art, and in particular, in response to the problems and needs in the art that have not yet been fully solved by currently available apparatus. Accordingly, the present invention has been developed to provide an angle stop valve comprising: a valve body defining an angled interior passageway, the valve body threaded to rotatably receive a handle, the passageway adapted to communicate fluid from an inlet shank connected to valve body to an outlet shank connected to the valve body; wherein the valve body is hexagonal through a cross-section; a cylindrical inlet shank comprising a cylindrical stem body and a shank having a plurality of circumscribing flanges adapted to act as barbs for forming a friction fit with enveloping PEX piping; and a cylindrical outlet shank having a proximal cylindrical valve body, the proximal cylindrical valve body dimensioned to be larger in diameter and housing a larger volume of fluid than a laterally-protruding stem 110 having a plurality of circumscribing flanges adapted to act as barbs for forming a friction fit with enveloping PEX piping; wherein the handle forms a protuberance extending laterally from the valve body a distance less than a length of the cylindrical stem body.

The apparatus may consist of three circumscribing flanges. The apparatus may consist of two circumscribing flanges. The handle may form an isosceles triangle, in some embodiments, through a cross-section.

A second angle stop valve is provided comprising: a valve body defining an angled interior passageway, the valve body threaded to rotatably receive a handle, the passageway adapted to communicate fluid from an inlet shank connected to valve body to an outlet shank connected to the valve body; wherein the valve body is hexagonal through a cross-section; a cylindrical inlet shank comprising a cylindrical stem body and a shank having two circumscribing flanges adapted to act as barbs for forming a friction fit with enveloping PEX piping; and a cylindrical outlet shank having a proximal cylindrical valve body, the proximal cylindrical valve body dimensioned to be larger in diameter and housing a larger volume of fluid than a laterally-protruding stem 110 having three circumscribing flanges adapted to act as barbs for forming a friction fit with enveloping PEX piping; wherein the handle forms a protuberance extending laterally from the valve body a distance equal to a length of the cylindrical stem body.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to convey a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
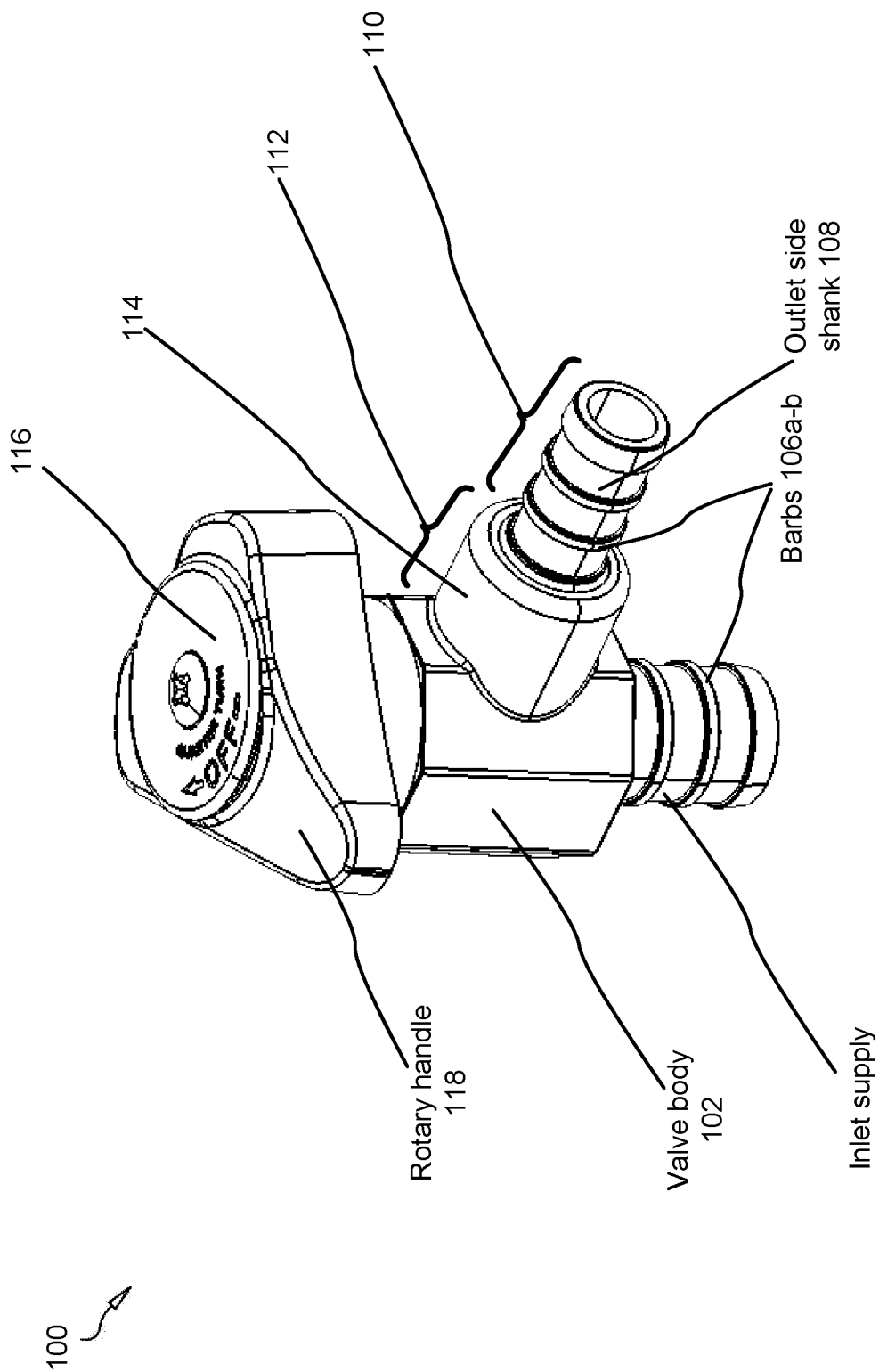
FIG. 1 is a forward, side perspective view of a dual, barbed angle-stop valve in accordance with the present invention.

FIG. 1 is a forward, side perspective view of a dual, barbed angle-stop valve 100 in accordance with the present invention.

The valve body 102 includes inlet supply shank 104 adapted to be connected to a water supply line, an outlet side shank 108 adapted to be connected to an outlet line and a handle 118 which rotatably opens and closes the value. The valve body 102 is hexagonal through The inlet supply shank 104 defines a port which establishes a fluid flow path from inlet supply shank 104, through an interiorly-defined passageway, through to the outlet side shank 108.

The valve 102 defines a housing chamber for receiving a valve stem disposing below the handle 118.

The valve 100 is designed to control the flow of fluid from a source via the valve 100, to a destination facet or appliance. In the angled valve 100, the inlet supply shank 104 and the outlet side shank 108 are disposed perpendicularly to one another, but conjoin within the valve 100 to communicate fluid.

The handle 118 is rotatably received within the valve body 102 to control the flow of fluid through a through passageway interior to the valve 100. The handle 118 may comprise a valve stem to withstand the torque applied to the handle 118.

The inlet supply shank 104 and the outlet side shank 108 comprise radially extending flanges 106 (or barbs 106) which act to increase the friction fit between the valve 100 and PEX tubing.

The distal ends of each shank 104, 108 are barbed for use with PEX piping which is crimped over the shanks 104, 108.

The shank 108 protrudes from a cylindrical stem body 114 having a length 112 sufficient to allow the handle 118 to rotate axially above the cylindrical stem body 114 without rotating over the shank 108. The length 112 also facilitates ready use of a crimping tool on the stem. The diameter of the cylindrical stem body 114 exceed the diameter of the flanges 106.

The valve body 102 comprises or defines a control sleeve within which the valve stem positioned below the handle 118 rotates axially. A resilient control sleeve may be rotatably mounted within valve body 102.

Figure 2:
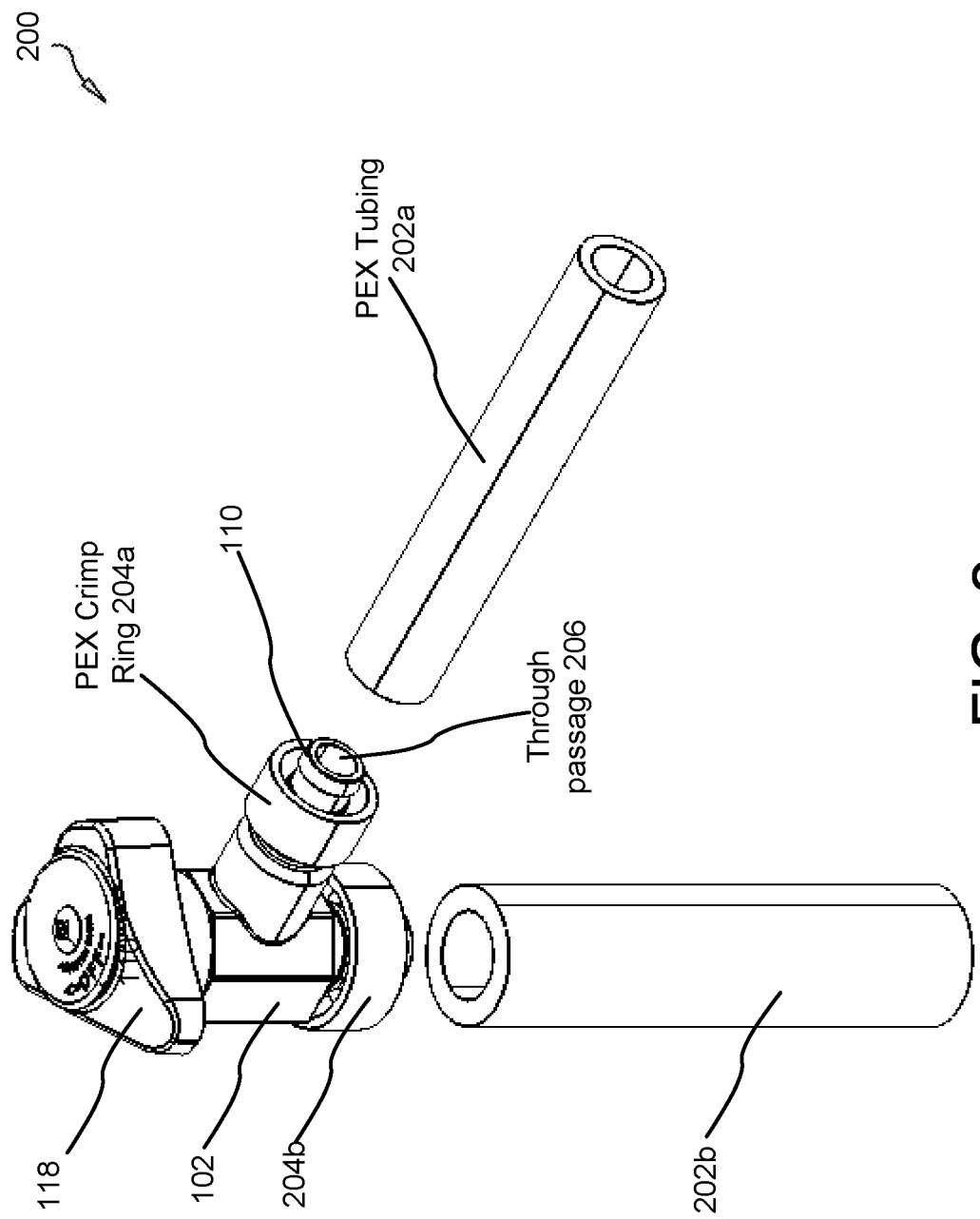
FIG. 2 is an environmental, forward, side perspective view of a dual, barbed angle-stop valve in accordance with the present invention.

FIG. 2 is an environmental, forward, side perspective view of a dual, barbed angle-stop valve 200 in accordance with the present invention.

In accordance with one aspect of the present invention, the plumbing valve 200 includes a valve body having an inlet 104 and an outlet 108. A resilient control sleeve may be disposed within the valve body for rotation between an open and closed position. The shanks 104, 108 open at their axial inlets and outlets forming ports for fluid communication through a passageway in the valve 200.

A valve stem beneath the handle is rotatably received within a receiving bore of the valve body 102 for opening and closing the valve.

The valve 200 is affixed to PEX tubing 202 as shown. Two PEX tubes (or tubing) 202a-b are affixed, each respectively, to a shank 104, 108. Crimping rings 204a-b may be crimped over the barbed ends of the shanks 104, 108 as shown using crimping tools.

Figure 3:
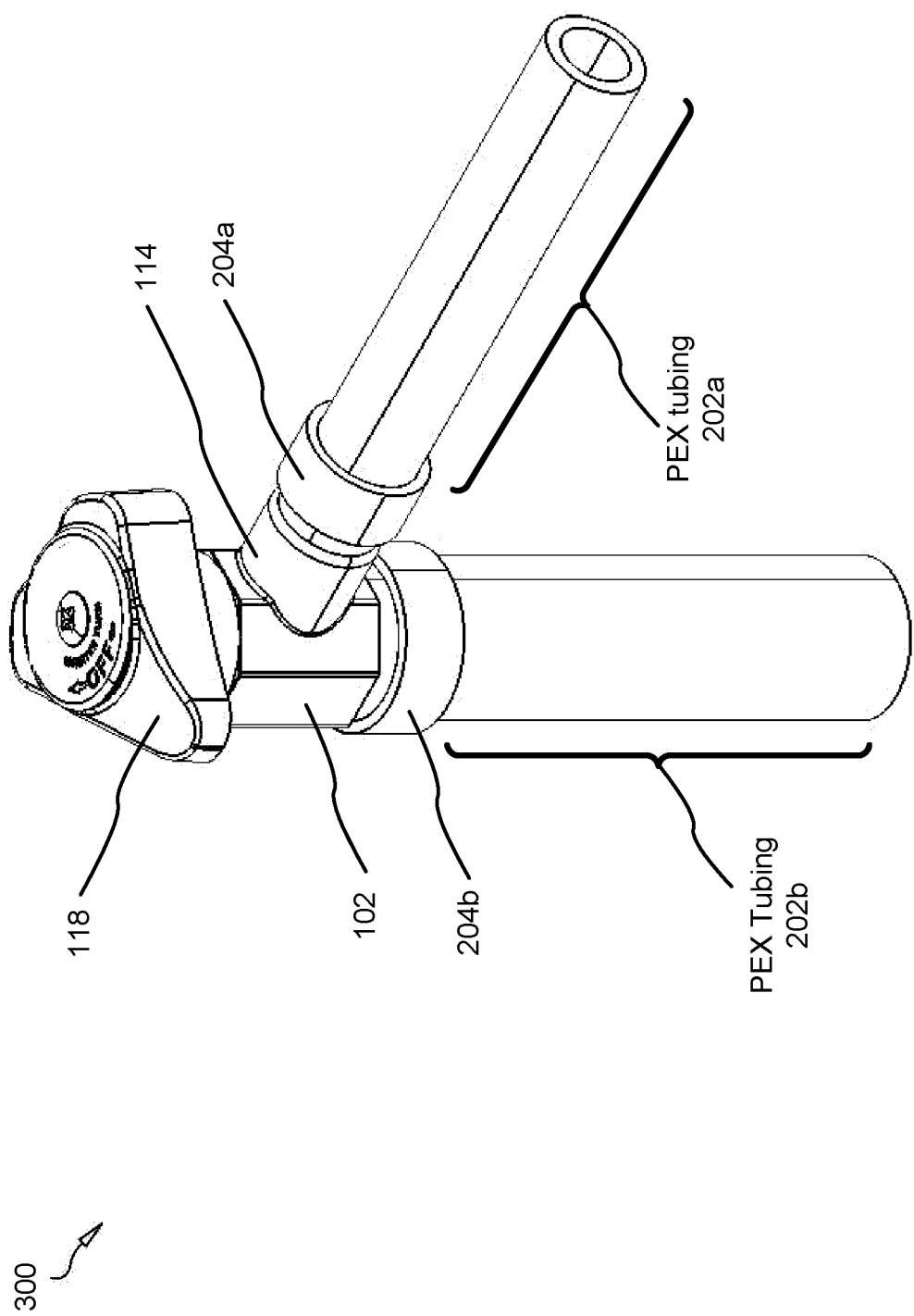
FIG. 3 is an environmental, forward, side perspective view of a dual, barbed angle-stop valve in accordance with the present invention.

FIG. 3 is an environmental, forward, side perspective view of a dual, barbed angle-stop valve 300 in accordance with the present invention.

The PEX tubing 202a-b and crimping rings 204a-b are affixed as shown.

Figure 4:
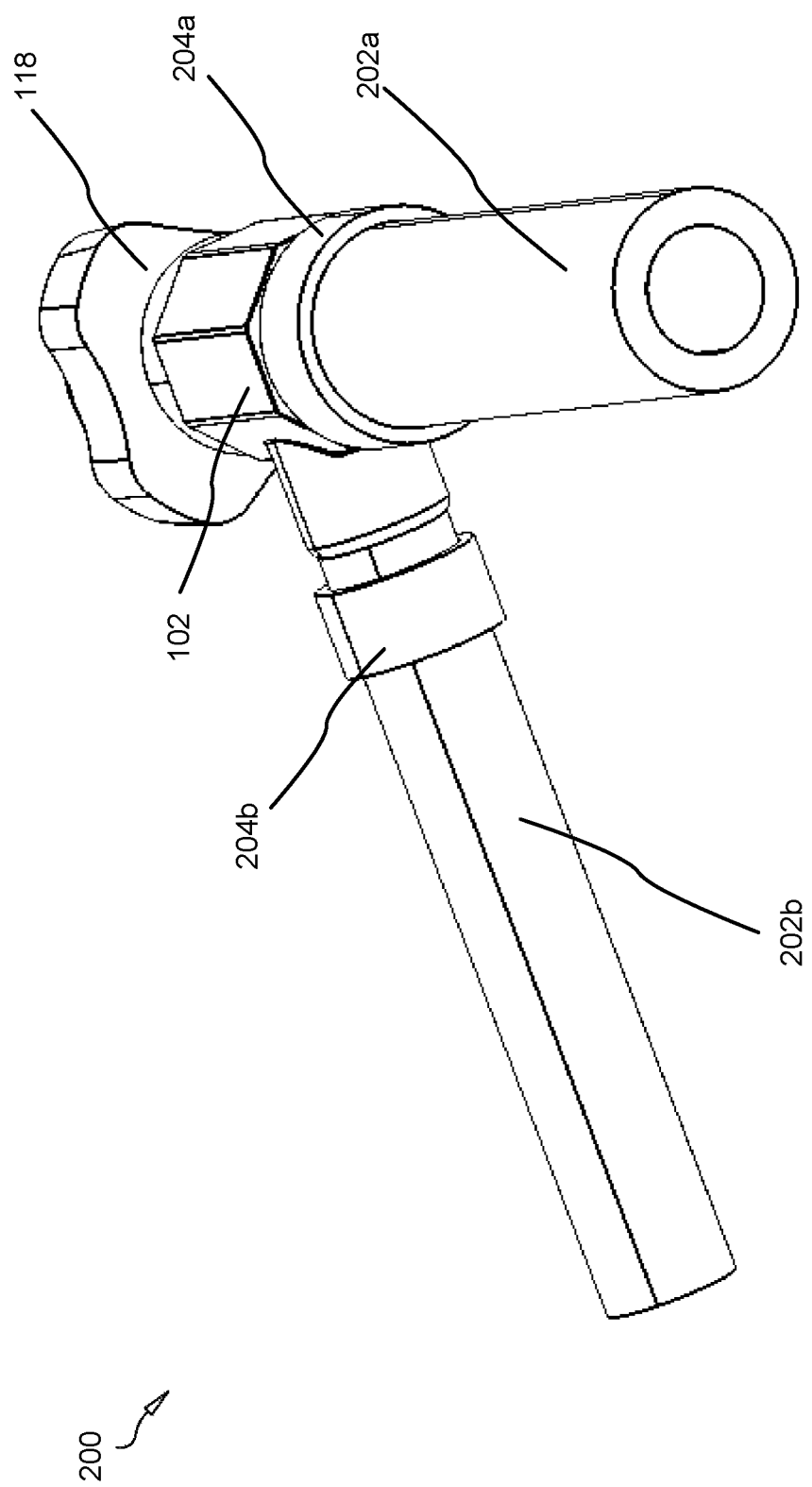
FIG. 4 is an environmental, forward perspective view of a dual, barbed angle-stop valve in accordance with the present invention.

FIG. 4 is an environmental, forward perspective view of a dual, barbed angle-stop valve 400 in accordance with the present invention.

The PEX piping 202 and crimping rings 204 are assembled with the valve 400 as shown.

Figure 5:
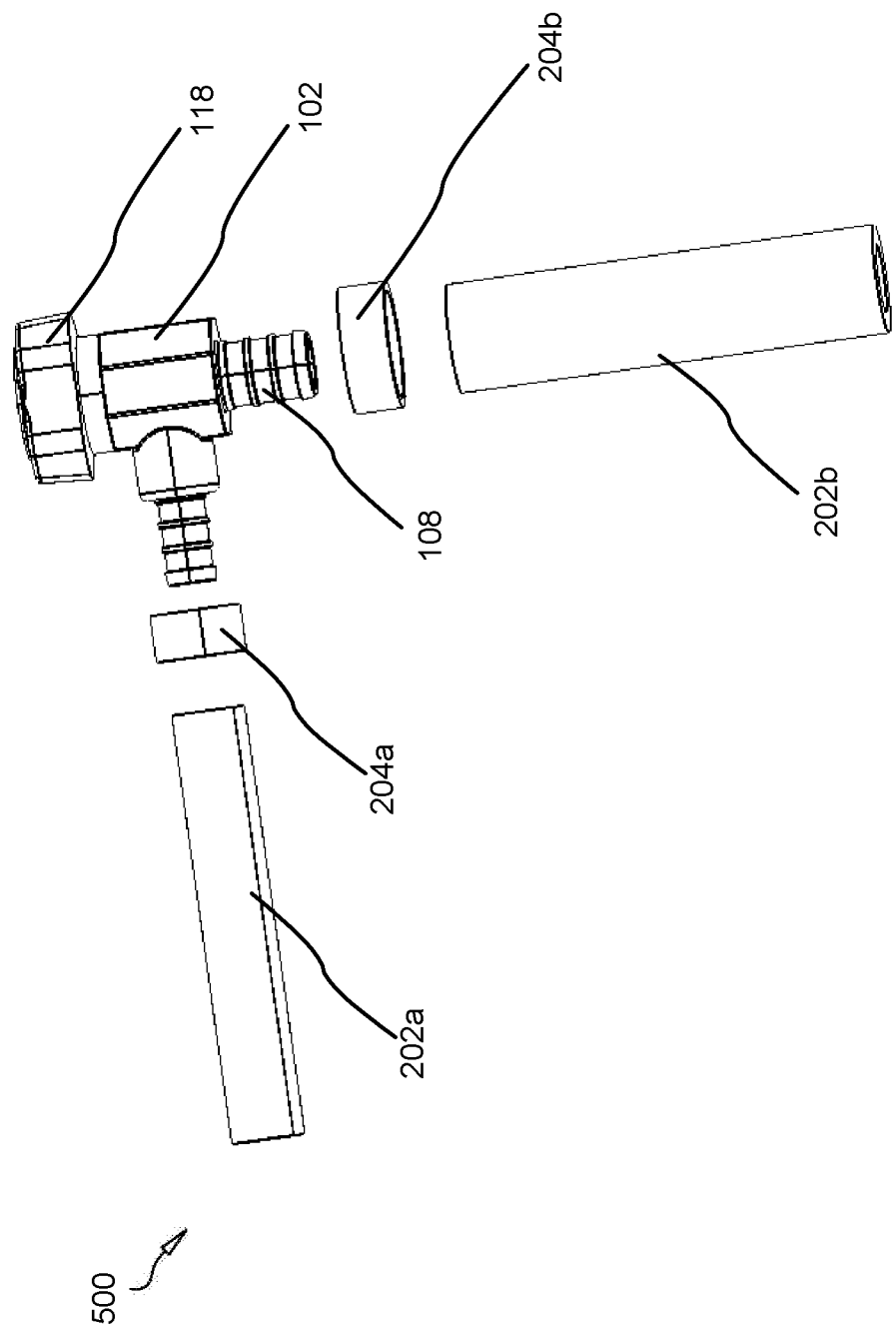
FIG. 5 is a forward perspective view of a dual, barbed angle-stop valve in accordance with the present invention.

FIG. 5 is a forward perspective view of a dual, barbed angle-stop valve 500 in accordance with the present invention.

The PEX piping 202 and crimping rings 204 are disassembled as shown.

The water or fluid pressure coming into the inlet shank 104 may exceed the pressure of the fluid coming out of the outlet shank 108 such that more circumscribing flanges, or barbs, are optimal on the inlet shank 104 than the outlet shank 108. As such the inlet shank 104 may comprise or consist of three circumscribing flanges 106 while the outlet shank 108 comprises or consists of two circumscribing flanges.

Figure 6:
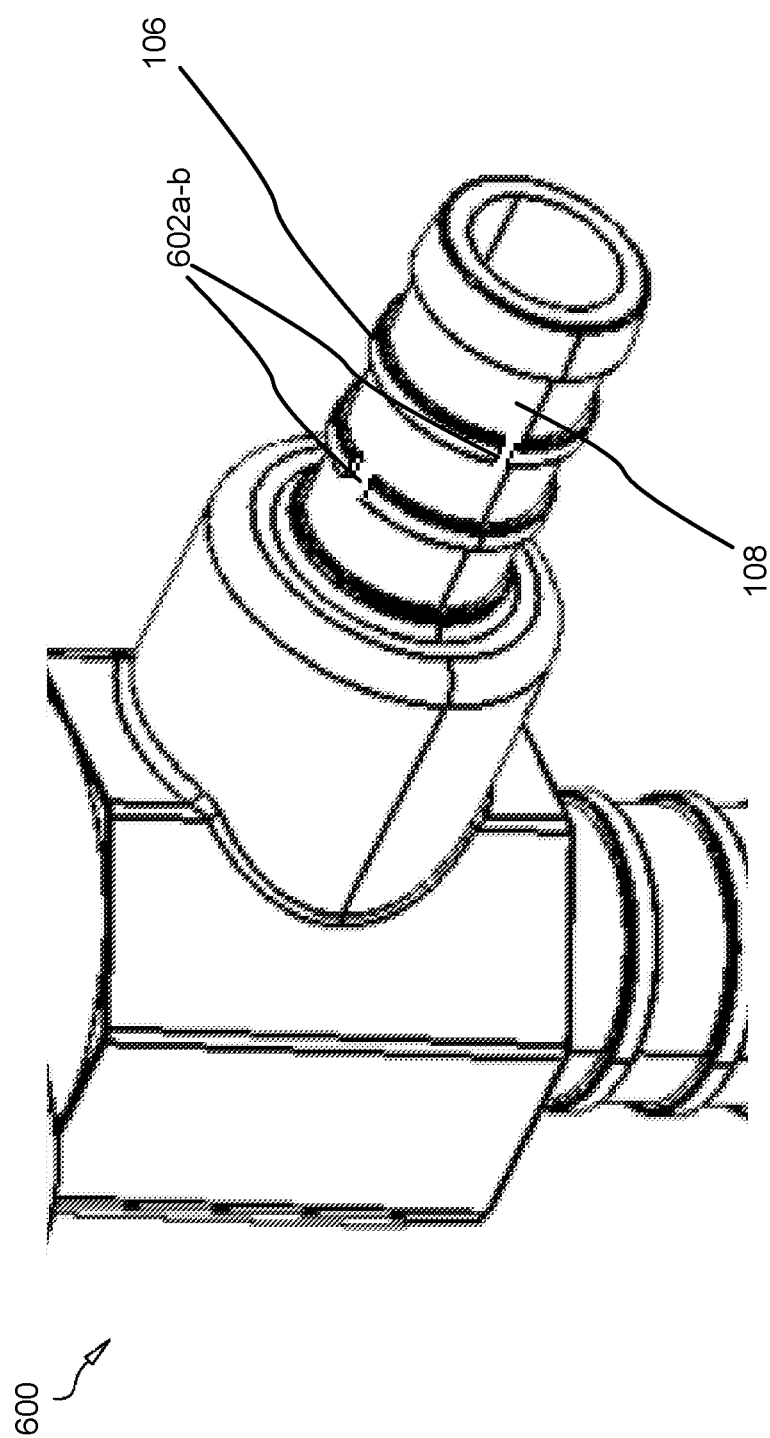
FIG. 6 is an exploded, forward, side perspective view of the outlet supply shank of a dual, barbed angle-stop valve in accordance with the present invention.

FIG. 6 is an exploded, forward, side perspective view of the outlet supply shank of a dual, barbed angle-stop valve in accordance with the present invention.

The outlet shank 108 in the shown embodiment comprises two concentric barbed flanges 602, but may comprise three, four or five. The barbs 106 may not entirely circumscribe the inlet supply shank 106 or the outlet side shank 108 as shown. As shown the barbs 106 may be broken in their circumcision, leaving teeth which act to bit into enveloping PEX tubing, increasing a friction between the shanks 104, 108 and the PEX tubing. In various embodiments, only the barbs 106 positioning proximally to the valve body 102 are broken while the barbs 106 positioning distally are unbroken to prevent fluid leakage.

Figure 7:
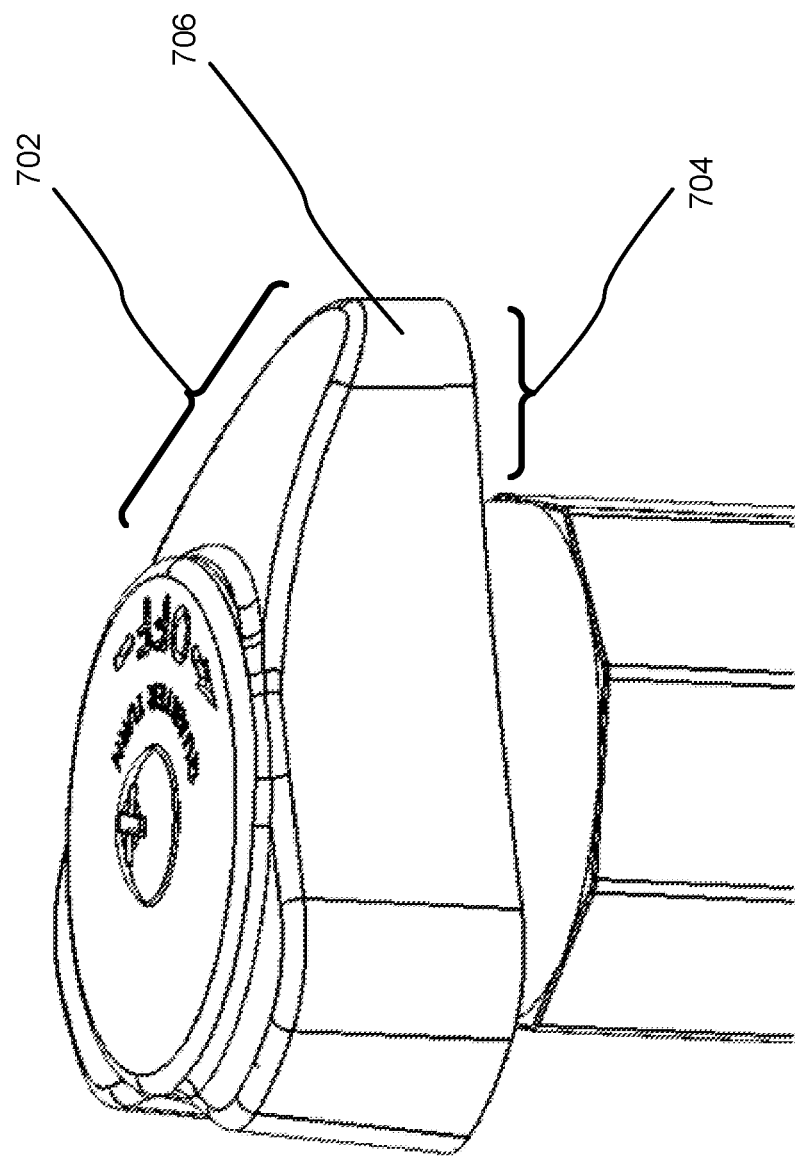
FIG. 7 is an exploded side perspective view of the handle of a dual, barbed angle-stop valve in accordance with the present invention.

FIG. 7 is an exploded side perspective view of the handle of a dual, barbed angle-stop valve 700 in accordance with the present invention.

The handle 118 as shown is triangular through a cross-section from an upper perspective, but is not scalene or of uniform congruency. Two of the sides are of equal length, these sides forming a cantilevering protuberance 706 which cantilevers a distance 704 over the cylindrical stem body 114, wherein the distance 704 is less than the distance 112 such that a crimping tool affixed over the shank 108 does not interfere with and is not obstructed by the protuberance 706. In some embodiments, the distance 704 is equal to the distance 114.

Figure 8:
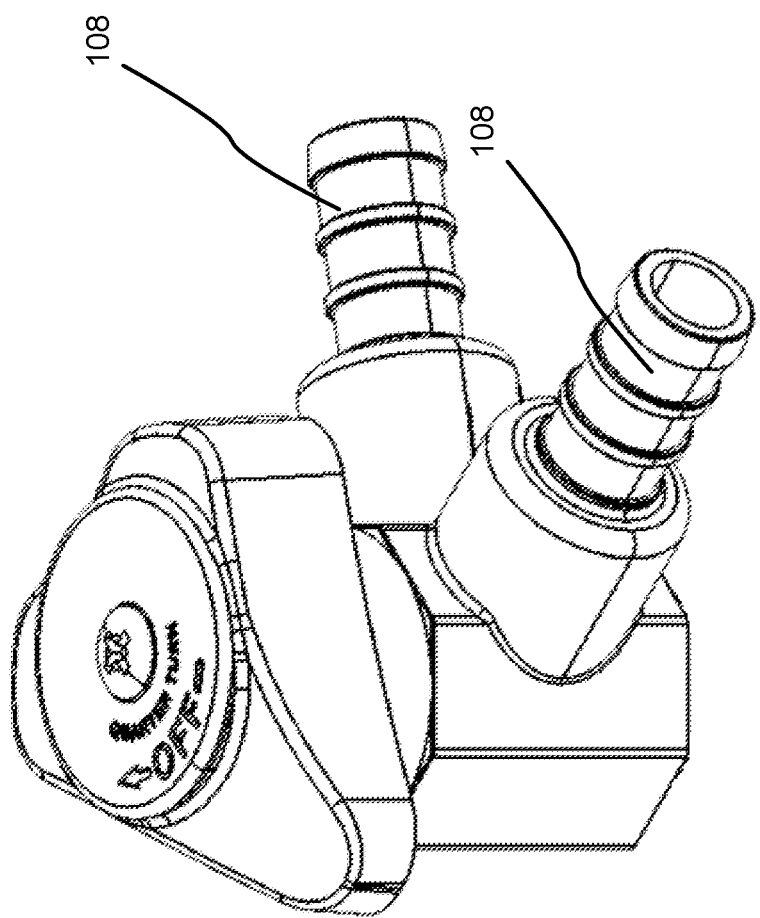
FIG. 8 is an exploded side perspective view of barbed angle-stop valve in accordance with the present invention.

FIG. 8 is an exploded side perspective view of barbed angle-stop valve 800 in accordance with the present invention.

As shown, the stop valve 800 may comprise a plurality of outlet shanks 108. In some embodiments, the valve 800 may not comprise an inlet shank.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An angle stop valve comprising:
a valve body defining an angled interior passageway, the valve body threaded to rotatably receive a handle, the passageway adapted to communicate fluid from an inlet shank connected to the valve body to an outlet shank connected to the valve body;
wherein the valve body is hexagonal through a cross-section;
a inlet shank comprising a cylindrical stem body having a plurality of circumscribing flanges adapted to act as barbs for forming a friction fit with enveloping PEX piping; and
the outlet shank having a proximal cylindrical valve body and a laterally-protruding stem, the proximal cylindrical valve body dimensioned to be larger in diameter and housing a larger volume of fluid than the laterally-protruding stem, the laterally-protruding stem having a plurality of circumscribing flanges adapted to act as barbs for forming a friction fit with enveloping PEX piping;
wherein the handle forms a protuberance extending laterally from the valve body a distance less than a length of the proximal cylindrical valve body.

2. The angle stop valve of claim 1, wherein each of the plurality of circumscribing flanges consists of three circumscribing flanges.

3. The angle stop valve of claim 1, wherein each of the plurality of circumscribing flanges consists of two circumscribing flanges.

4. The angle stop valve of claim 1, wherein the handle forms an isosceles triangle through a cross-section.

5. An angle stop valve comprising:
a valve body defining an angled interior passageway, the valve body threaded to rotatably receive a handle, the passageway adapted to communicate fluid from an inlet shank connected to the valve body to an outlet shank connected to the valve body;
wherein the valve body is hexagonal through a cross-section;
the inlet shank comprising a cylindrical stem body having two circumscribing flanges adapted to act as barbs for forming a friction fit with enveloping PEX piping; and
the outlet shank having a proximal cylindrical valve body and a laterally-protruding stem, the proximal cylindrical valve body dimensioned to be larger in diameter and housing a larger volume of fluid than the laterally-protruding stem, the laterally-protruding stem having three circumscribing flanges adapted to act as barbs for forming a friction fit with enveloping PEX piping;
wherein the handle forms a protuberance extending laterally from the valve body a distance equal to a length of the proximal cylindrical valve body.

6. A stop valve consisting of:
a valve body defining an interior passageway, the valve body threaded to rotatably receive a handle, the passageway adapted to communicate fluid from an inlet shank connected to the valve body to a plurality of outlet shanks connected to the valve body;
wherein the valve body is hexagonal through a cross-section;
the plurality of outlet shanks each having a proximal cylindrical valve body and a laterally-protruding stem, each proximal cylindrical valve body body dimensioned to be larger in diameter and housing a larger volume of fluid than each laterally-protruding stem, each laterally-protruding stem having three circumscribing flanges adapted to act as barbs for forming a friction fit with enveloping PEX piping;

wherein the handle forms a protuberance extending laterally from the valve body a distance equal to a length of each proximal cylindrical valve body.

\* \* \* \* \*